US012223487B2

(12) United States Patent
Gilbert et al.

(10) Patent No.: US 12,223,487 B2
(45) Date of Patent: Feb. 11, 2025

(54) INTERACTIVE KIOSK FOR DISPLAYING A CODE THAT IS IMAGED BY A PORTABLE ELECTRONIC TO CAUSE THE PORTABLE ELECTRONIC DEVICE TO PERFORM AN OPERATION AND METHOD THEREOF

(71) Applicant: IKE Smart City, LLC, Columbus, OH (US)

(72) Inventors: Alan J. Gilbert, Westerville, OH (US); Peter D. Scantland, Upper Arlington, OH (US); Gregory S. Walker, Jr., Newark, OH (US); Graham D. Conzett, Columbus, OH (US)

(73) Assignee: IKE SMART CITY, LLC, Columbus, OH (US)

( * ) Notice: Subject to any disclaimer, the term of this patent is extended or adjusted under 35 U.S.C. 154(b) by 0 days.

(21) Appl. No.: 16/747,929

(22) Filed: Jan. 21, 2020

(65) Prior Publication Data
US 2020/0349543 A1 Nov. 5, 2020

Related U.S. Application Data

(60) Provisional application No. 62/841,999, filed on May 2, 2019.

(51) Int. Cl.
G06Q 20/18 (2012.01)
G06F 3/0488 (2022.01)
G06Q 20/32 (2012.01)
G06Q 50/26 (2012.01)
G07F 9/00 (2006.01)

(52) U.S. Cl.
CPC .......... *G06Q 20/18* (2013.01); *G06F 3/0488* (2013.01); *G06Q 20/325* (2013.01); *G06Q 20/3276* (2013.01); *G06Q 50/26* (2013.01); *G07F 9/001* (2020.05)

(58) Field of Classification Search
CPC .. G06Q 20/18; G06Q 20/325; G06Q 30/0284; G06Q 20/3276; G06K 7/1095; G07F 9/002
USPC ........................................................ 235/381
See application file for complete search history.

(56) References Cited

U.S. PATENT DOCUMENTS

| 8,707,163 B2 | 4/2014 | Boudville |
| 8,850,181 B2 * | 9/2014 | Black .................. G07F 7/00 713/150 |
| 9,256,726 B2 | 2/2016 | Ordille et al. |

(Continued)

Primary Examiner — Suezu Ellis
(74) Attorney, Agent, or Firm — Wentsler LLC

(57) ABSTRACT

Provided are a kiosk and method for anonymously relaying content from a public kiosk to a portable electronic device. The method includes receiving user input corresponding to content requested by a user, and accessing information stored by a non-transitory computer-readable medium. With at least one computer processor, an output comprising a computer-readable code encoding the content requested by the user is generated, and displayed using a computer display device operatively connected to the at least one computer processor. The computer-readable code, as a result of being captured by an optical imaging device provided to the portable electronic device, is interpreted to cause the portable electronic device to execute computer-executable instructions stored by the portable electronic device to perform an operation corresponding to the computer-readable code.

13 Claims, 8 Drawing Sheets

(56) References Cited

U.S. PATENT DOCUMENTS

| | | | |
|---|---|---|---|
| 2005/0102233 A1* | 5/2005 | Park | G06Q 30/06 |
| | | | 705/44 |
| 2007/0050266 A1* | 3/2007 | Barber | G06Q 30/0601 |
| | | | 705/26.1 |
| 2010/0296234 A1* | 11/2010 | Crick, Jr. | G09F 27/00 |
| | | | 361/679.21 |
| 2013/0035787 A1* | 2/2013 | Canter | G06Q 30/0241 |
| | | | 700/232 |
| 2013/0086465 A1 | 4/2013 | Boudville | |
| 2014/0166749 A1* | 6/2014 | Argue | G07F 9/023 |
| | | | 235/381 |
| 2015/0249353 A1* | 9/2015 | Hamilton, IV | H02J 7/0045 |
| | | | 320/114 |
| 2015/0294431 A1 | 10/2015 | Fiorucci et al. | |

* cited by examiner

INTERACTIVE KIOSK FOR DISPLAYING A CODE THAT IS IMAGED BY A PORTABLE ELECTRONIC TO CAUSE THE PORTABLE ELECTRONIC DEVICE TO PERFORM AN OPERATION AND METHOD THEREOF

BACKGROUND OF THE INVENTION

1. Field of the Invention

This application relates generally to an interactive kiosk installed at a geographic location and, more specifically, to a kiosk and dynamic method of providing information services to pedestrians at a geographic location.

2. Description of Related Art

Conventional kiosks can be programmed to display information to onlookers. The information displayed can include advertisements about upcoming events, notifications, and other information that is pertinent to the geographic location where the kiosk is installed. However, the information displayed is typically fixed, once programmed, or periodically changed according to a scheduled program. Onlookers traditionally have not had the ability to access user-specific information, on demand.

Because public kiosks are intended to broadcast a defined set of generic information to the general public, kiosks have traditionally lacked the ability to communicate information to, or receive data from, portable electronic devices. A communication ability, even if provided to a kiosk, is unlikely to be used out of security concerns by owners of the portable electronic devices. For example, establishing a peer connection via an authentication process involving the exchange of information between a portable, personal electronic device (e.g., an iPhone) and a public kiosk could invite malicious attempts to access the personal electronic device.

Further, if a public kiosk requires device-specific information to be received from the personal electronic device, owners of the personal electronic devices may suspect that such information is being collected for purposes other than simply establishing the peer connection. For example, device-specific information such as a phone number, MAC address, etc. could be collected by the kiosk, and possibly combined with data collected by other kiosks or other data repositories. Analyzing such information could allow the movements, preferences, and possibly other information about users of the portable electronic devices to be determined or inferred, raising privacy concerns that may prevent widespread usage of public kiosks with portable electronic devices.

BRIEF SUMMARY OF THE INVENTION

According to one aspect, the subject application involves a kiosk that communicates with a portable electronic device. The kiosk includes a base constructed for installation in a public setting, and an interface that is supportable by the base, and receives user input corresponding to content requested by a user. A control system comprising at least one computer processor, as a result of executing computer-accessible instructions, causes the control system to access information stored by a non-transitory computer memory and generate an output comprising a computer-readable code encoding the content requested by the user. Aa display device operatively connected to the control system graphically displays the computer-readable code in a manner to be captured by an optical imaging device provided to the portable electronic device. The computer-readable code is interpreted by the portable electronic device as a result of being captured by the optical imaging device, causing the portable electronic device to execute computer-executable instructions stored by the portable electronic device to perform an operation corresponding to the computer-readable code.

According to another aspect, the subject application involves a method of communicating with a portable electronic device. The method includes receiving, with an interface that is supported by a base installed in a public setting, user input corresponding to content requested by a user; accessing, with at least one computer processor, information stored by a non-transitory computer-readable medium; and generating, with the at least one computer processor, an output comprising a computer-readable code encoding the content requested by the user. With a computer display device operatively connected to the at least one computer processor, the output including the computer-readable code is displayed in a manner to be captured by an optical imaging device provided to the portable electronic device. The computer-readable code included in the displayed output is interpretable by the portable electronic device as a result of being captured to cause the portable electronic device to execute computer-executable instructions stored by the portable electronic device to perform an operation corresponding to the computer-readable code.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
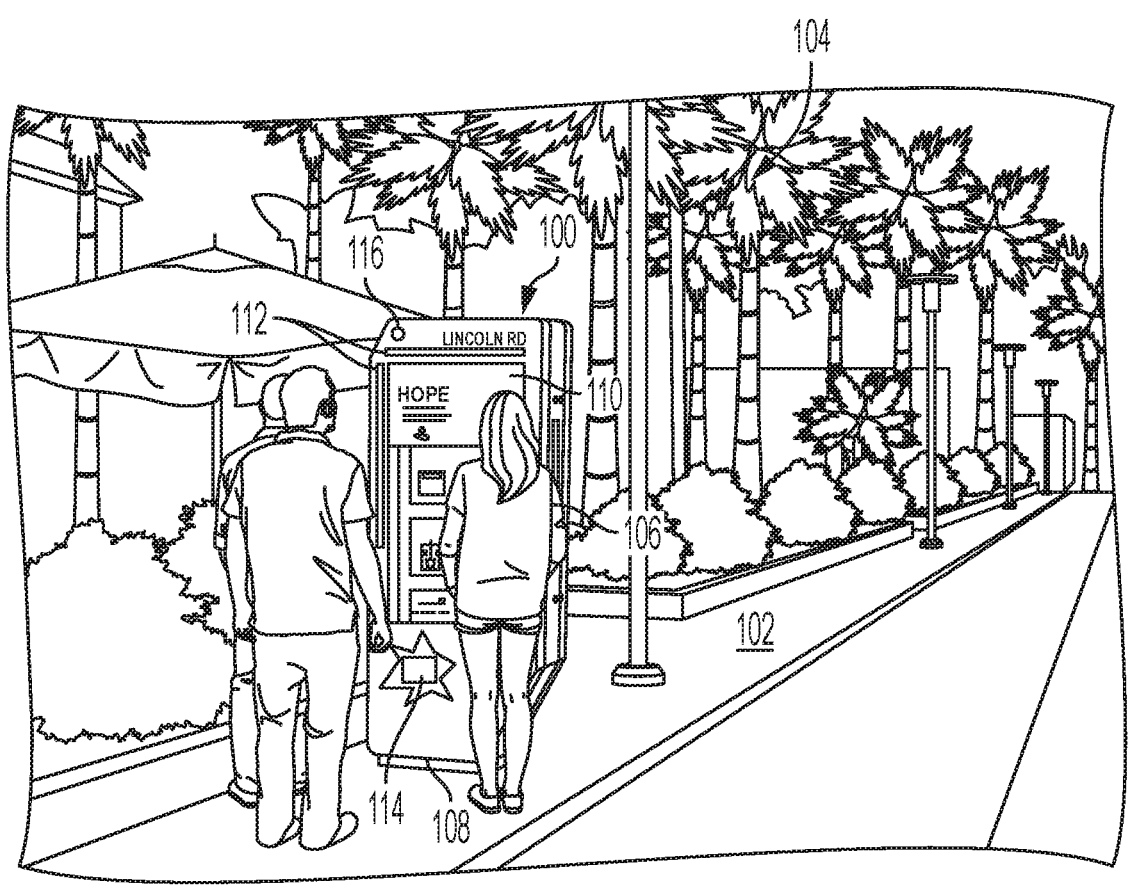
FIG. 1 shows an embodiment of a kiosk fixedly installed in a public, outdoor environment.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

The present technology is directed toward a kiosk to be installed at a public location. The kiosk is publicly accessible to allow pedestrians to access content related to the geographic location where the kiosk is installed, optionally in addition to other content. To transmit at least a portion of the content accessed using the kiosk (or related content) to a portable electronic device such as a smartphone, the kiosk displays a computer-readable code that can be optically interrogated by a camera provided to the portable electronic device. For example, a camera provided to a smartphone (e.g., iPhone, Samsung Galaxy, etc.) can capture an image of a QR ("Quick Response") code® displayed by the kiosk. Information encoded by the displayed QR code® is utilized by the smartphone to control execution of an operation such as: launching an executable application installed on the smartphone, initiating a download process for installing an executable application on the smartphone, transmitting content to a website or other network-accessible resource, directing a web browser application to a website, access any resource at a specific network address of the Internet indicated by the QR code® using a cellular and/or a local area network communication protocol, etc.

Embodiments of the resource accessed by the smartphone as a result of interrogating the computer-readable code can: (i) provide directions to a desired destination identified as a result of user input into the kiosk; (ii) allow the user to complete a reservation at a restaurant, hotel or other destination identified as a result of user input into the kiosk; (iii) complete a transaction commenced using the kiosk; (iv) facilitate transportation for the user; (v) access a photograph captured by a camera provided to the kiosk; (vi) and/or serve any other desired purpose related to user input provided to the kiosk.

With reference to the drawings, FIG. 1 shows a kiosk 100 installed along a sidewalk 102, in a public, outdoor environment 104, where the kiosk 100 can be accessed by pedestrians 106. Although FIG. 1 shows the kiosk 100 installed at an outdoor location, the kiosk can be installed at an indoor location, a quasi-indoor location (e.g., bus terminal, subway station, etc.), or any other publicly-accessible location encountered by pedestrians 106.

As shown, the kiosk 100 includes a base 108 fixedly installed to the underlying ground, which is the sidewalk 102 in FIG. 1. Being fixedly installed, the base 108 can be bolted or otherwise anchored to the ground, requiring the use of a tool offering a mechanical advantage to separate the base 108 from the ground without subjecting the base 108 to damage.

A display device 110 is supported by the base 108 at an elevation vertically above the sidewalk 102. Embodiments of the base 108 and display device 110 can include a bottom edge of the display device 110 supported at least fifteen (15 in.) inches above the sidewalk 102, for example. The display device 110 can optionally be supported by the base so the top edge of the display device 110 is no more than forty-eight (48 in.) inches above the sidewalk 102.

The display device 110 can be configured as a touch-sensitive display device, forming an interface by which user input can be entered into the kiosk 100. For example, touch-sensitive circuitry 112 including one or more transparent electrodes can form an x-y grid of sensor pixels in a plane that is generally parallel with an external surface of the display device 110. Human contact with a region of the display device 110 influences a sensed electrical value in the vicinity of that region. The influence is detected by vertical and horizontal portions of the touch-sensitive circuitry 112 to pinpoint the location of the region that was contacted. A spatial relationship between content displayed by the display device 110 and the contacted region of the touch-sensitive circuitry 112 can be utilized by a control system 114, described below, that is operatively connected to the touch-sensitive circuitry 112 to provide context to the user input.

Although the embodiment of the interface is described above as a touch-sensitive display device, the present application technology is not so limited. Examples of other embodiments of the interface can optionally include at least one of a track ball, a track pad, and a keyboard.

A camera 116 (e.g., including a CMOS, CCD, etc. imaging sensor) can optionally be included as part of the kiosk 100. The camera can be trained on a region immediately in front of the kiosk 100, or on another region having a backdrop of interest. For example, a kiosk 100 installed within view of a landmark may include a camera 116 trained on that landmark. Pedestrians 106 can stand within the field of view of the camera 116, and have their photographs taken. The display device 110 can optionally display the field of view as a digital viewfinder, allowing the pedestrians 106 to properly position themselves within the photograph, relative to the landmark.

The photographs can be stored locally, in a non-transitory computer-readable medium 1005 (FIG. 10) connected to the control system 114, supported by the base 108. According to other embodiments, the photographs can be stored in a remotely-located, non-transitory computer-readable medium, by transmitting the photographs over a communication network. To limit the impact of transmitting photos on bandwidth available to the kiosk 100, transmission of the photos can occur at times when bandwidth usage is below a threshold, such as during the night, when few pedestrians are expected to interact the kiosk 100.

The control system 114 is operable to dynamically generate various graphical user interfaces such as menus, search interfaces, maps, and other content requested by pedestrians 106. According to one embodiment, the control system 114 can be a computing device 1000 or a computer 1015 forming a portion of the computing device 1000, as shown and described with reference to FIG. 10, for example.

Figure 2:
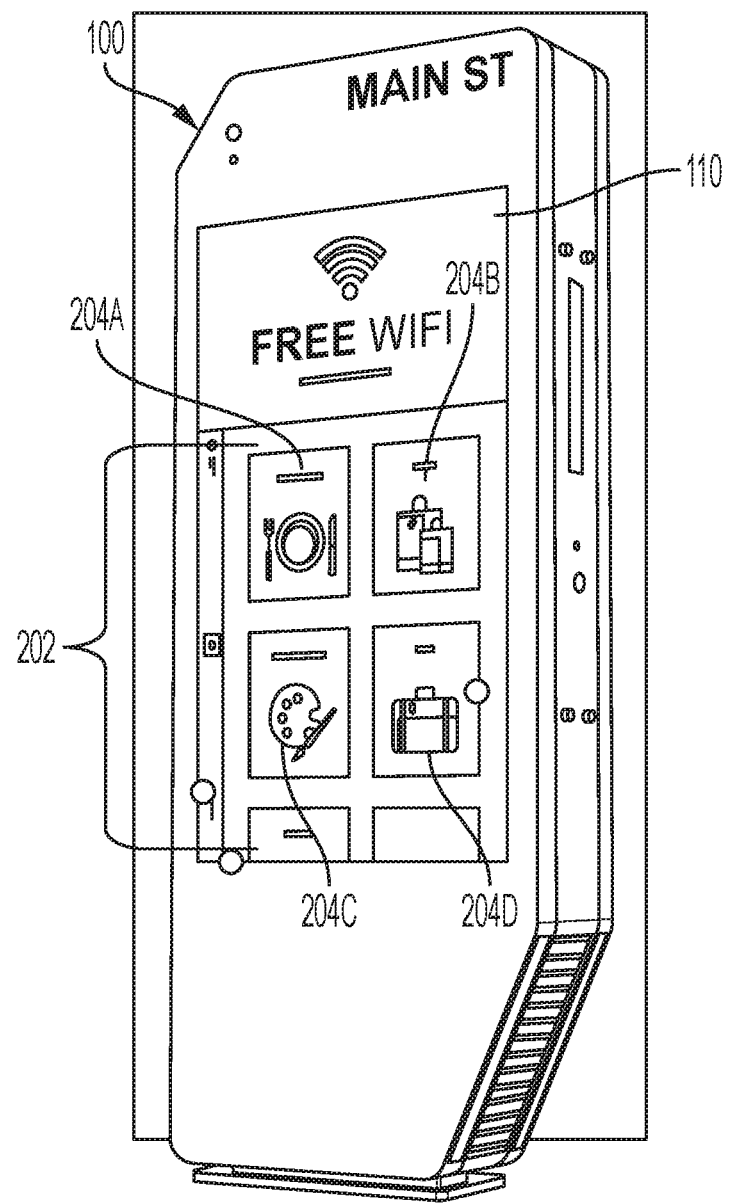
FIG. 2 shows an embodiment of a kiosk with a touch-sensitive display device displaying an interactive menu.

FIG. 2 shows an embodiment of the kiosk 100, with the display device 110 displaying an interactive menu 202. The menu 202 includes a plurality of icons, generally referred to at 204, each representing a different category of content that can be requested by a pedestrian 106 through the touch-sensitive display device 110 as the interface, for example. The menu 202 can optionally include all available icons 204, or can be scrollable, tabulated, or otherwise configured to allow hidden icons 204 that are not concurrently displayed on a single page to be made viewable.

The icons 204 of the embodiment of the kiosk 100 shown in FIG. 2 include a dining icon 204A. In response to receiving user input via the interface indicating a user selection of the dining icon 204A, the display device 110 can present a dining interface. For the present embodiments, and the description that follows, the interface will be described as a touch-sensitive display device 110 that receives user input as a result of the pedestrian 106 contacting the display device 110.

The dining interface can include information about local dining options in the vicinity of the geographic location of the kiosk 100. For example, a list of local dining options can be presented in an order of increasing distance from the kiosk. The order, and/or the local dining options displayed can optionally be user-definable. For example, the local dining options can be sorted based on at least one of: distance from the kiosk 100, user reviews, cost, etc. As another example, the local dining options displayed can be filtered based on at least one of: type of cuisine, cost, minimum review score, maximum distance from the kiosk 100, attire, etc., thereby limiting the number of local dining options displayed.

The local dining options displayed can optionally be obtained from a dining database, locally stored by the non-transitory computer-readable medium 1005 (FIG. 10) that is connected locally to the control system 114. Being locally connected allows the control system 114 to access and communicate with the non-transitory computer-readable medium 1005, even in the absence of a communication network connecting the kiosk 100 to a separate computer terminal. Information in the dining database can optionally be updated occasionally, such as by caching information received from a remotely-stored database over a communication network at times when such a network is available. Updates can also optionally be scheduled for times when network traffic is relatively low, compared to high-traffic times of day. The local dining options displayed can optionally be accompanied by information about the type of cuisine, and/or rating information indicating local dining reviews submitted by pedestrians or others who have dined at the respective local dining options. A refinement tool can optionally be provided to allow the pedestrians to filter the local dining options displayed according to at least one of: a desired cuisine, a minimum review threshold, a distance from the kiosk 100, and other options.

Figure 3:
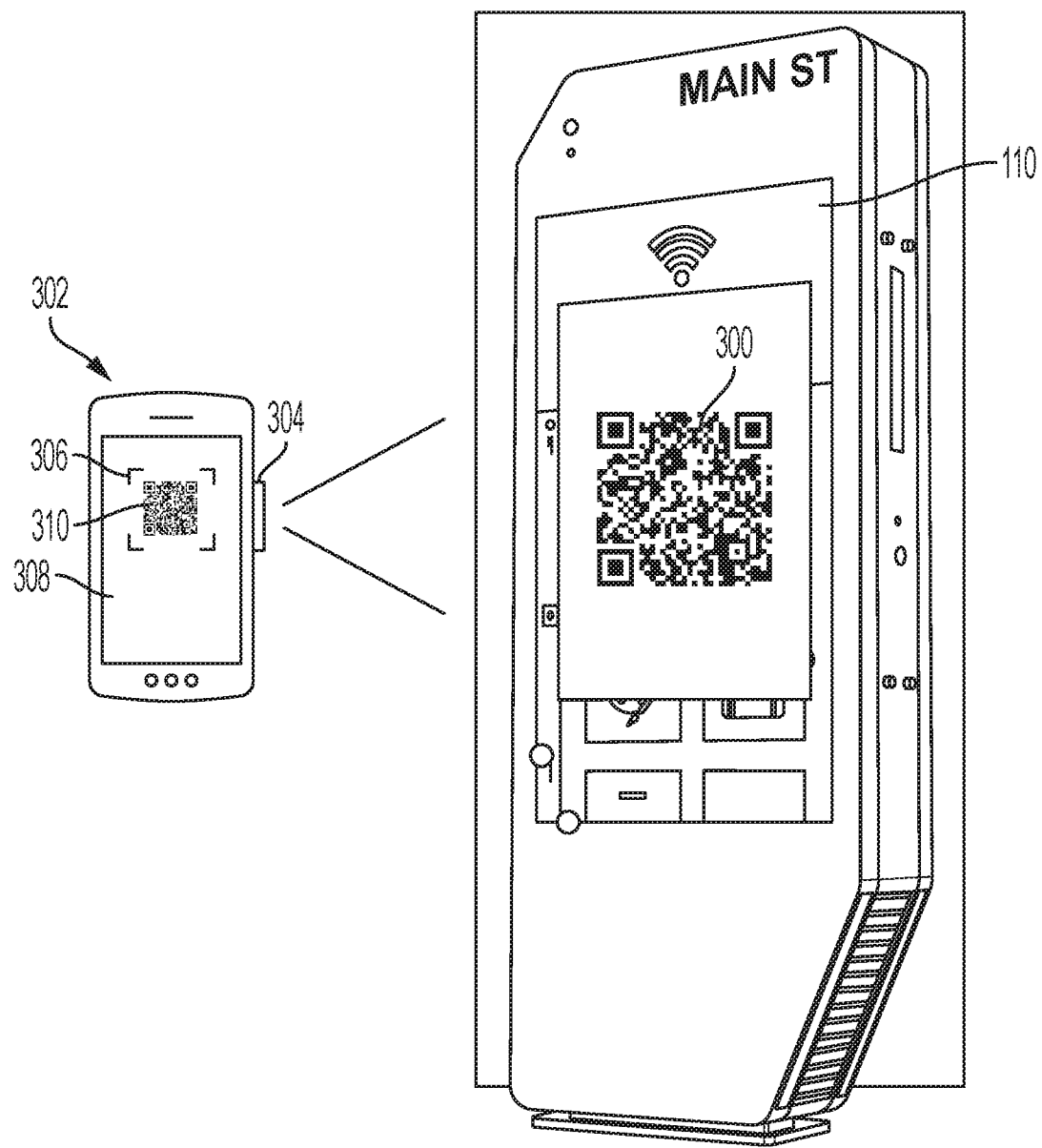
FIG. 3 shows an illustrative example of a portable electronic device capturing a digital image of a computer-readable code displayed by a public kiosk to optically convey encoded information to the portable electronic device.

In response to receiving user input selecting one of the displayed dining options, the control system 114 generates a computer-readable code 300, and causes the computer-readable code 300 to be displayed by the display device 110 as shown in FIG. 3. The computer-readable code 300 can include a pattern of markings that, when interpreted by a computing device programmed with executable instructions for decoding the computer-readable code 300 under a coding standard, can be decoded by the computing device to extract information encoded by the pattern of markings. Unlike alpha-numeric characters that are directly read and interpreted by the naked eye, the computer-readable code requires interpretation relative to the coding standard, to relate the pattern of markings to instructions that control performance of an operation by a portable electronic device 302, described below.

In the embodiment of FIG. 3, the computer-readable code 300 is a so-called quick response code or "QR code®," which is a two-dimensional barcode that is compliant with standardized barcoding symbology specification. For example, the QR code® can utilize a plurality (e.g., four) standardized encoding modes (numeric, alphanumeric, byte/binary, and kanji) to encode data, optionally with the use of an extension. Although QR codes® are described herein as the computer-readable code 300 for the sake of brevity and clarity, it is to be understood that the present disclosure is not limited to QR codes® and that other standardized codes can be utilized.

The QR code® displayed by the display device 110 encodes data conveyed to the portable electronic device 302 optically, in an "anonymous manner." Conveying the encoded data in an anonymous manner allows a data communication from the kiosk 100 to the portable electronic device 302 occur without requiring personal information about the pedestrian 106 or contact information for the portable electronic device 302 to be submitted to the kiosk 100. Instead of requiring the submission of a phone number, email address, zip code, or other personal information of the pedestrian, and without requiring transmission of a text message or other electronic communication from the portable electronic device 302 to the kiosk 100, the encoded data can be conveyed to the portable electronic device 302. The encoded data conveyed to the portable electronic device 302 is processed and utilized by the portable electronic device 302 to control execution of an operation. As a result, pedestrians 106 who may be reluctant to input personal information into the kiosk 100, or grant the kiosk 100 access to contact information for the portable electronic device 302 out of privacy concerns, can effectively interact with the kiosk 100 anonymously.

For example, the encoded data conveyed to the portable electronic device 302 can optionally include information such as a network address (e.g., IP address) or URL, or another locator, identifier, or tracker that points to a website or other network-accessible resource. According to such an example, the QR code® can encode the IP address of a website that is to be retrieved by the portable electronic device 302, allowing the pedestrian 106 to complete a process (e.g., making a reservation, purchasing an event ticket, making travel arrangements, etc.) that was initiated using the kiosk 100. The QR code® can optionally encode input to be transmitted to the website identified by the QR code®, such as a positive rating for a restaurant or other location input to the kiosk 100 to be posted to the website.

The encoded data can optionally identify an application to be executed by the portable electronic device 302 carried by the pedestrian 106, or any other resource to be utilized by the portable electronic device 302 to perform the operation. For example, the QR code® can identify an executable application on the portable electronic device 302 to be launched and/or installed to perform the operation. Apple Maps, for instance, can be caused to be launched as a result of the portable electronic device 302 receiving direction information, or at least a destination, encoded by the QR code®. If Apple Maps is installed in computer readable medium provided to the portable electronic device 302, the application can be launched. If Apple Maps is not installed, the data encoded by the QR code® can cause the portable electronic device 302 to access the App Store (or other resource), from where Apple Maps (or another executable application) can be downloaded and installed on the portable electronic device 302. The data encoded by the QR code® can optionally initiate the process of purchasing and/or downloading the appropriate executable application. The process of purchasing and/or downloading the appropriate executable application can optionally be initiated without pedestrian intervention other than using the portable electronic device 302 to capture the QR code®. According to other embodiments, the portable electronic device 302 may prompt the pedestrian 106 to input confirmation that purchasing and/or downloading the appropriate executable application is authorized.

As mentioned previously, the portable electronic device 302 can be a cellular telephone such as a smartphone, examples of which include an iPhone, Samsung Galaxy, etc. The portable electronic device 302 can communicate over the Internet or a local area network utilizing a cellular communication network, a local area network, or a combination thereof. Generally, the portable electronic device is another embodiment of a computing device 1000, or a computer 1015 forming a portion of the computing device 1000, discussed below with reference to FIG. 10.

For the embodiment involving the dining interface, the pedestrian 106 who selected the dining option can use the portable electronic device 302 to capture a digital image 310 of the displayed QR code®. For example, a camera 304 or other optical imaging device (e.g., including a complementary metal oxide semiconductor (CMOS) image capture device, charge coupled device (CCD) image sensor, etc.) provided to the portable electronic device 302 can be trained on the displayed QR code®. Positioning the QR code® in a viewfinder 306 displayed by the display screen 308 of the portable electronic device 302 provides the portable electronic device 302 with a reference to interpret the QR code®

Because the camera 304 or other optical imaging device is used to interrogate the QR code®, the encoded information is "transmitted" or "conveyed" in an anonymous manner to the portable electronic device 302 by the kiosk 100. Such a transmission is accomplished without requiring a handshake process to be performed or other information to be exchanged between the portable electronic device 302 and the kiosk 100 to otherwise establish a communication channel between the portable electronic device 302 and the kiosk 100. In other words, receipt by the kiosk 100 of data from the portable electronic device 302, and receipt by the portable electronic device 302 of data connecting the two systems with a WiFi connection compliant with IEEE 802.11x, a nearfield wireless communication connection (e.g., Bluetooth), etc., is not required. Thus, information specific to the portable electronic device 302 that could potentially be accessible to the kiosk 100 to establish such as connection is kept from the kiosk 100. As a result, the portable electronic device 302 can remain "anonymous" to the kiosk 100, yet receive the information encoded by the QR code®. Of course, other embodiments of the kiosk 100 can be configured to provide wireless, local area network access (e.g., WiFi access) to devices within range of the kiosk 100. However, even for such embodiments, the WiFi connection (and any information exchanged) between the portable electronic device 302 and the kiosk 100 to facilitate such local area network access can remain separate from the interaction involving interrogation of the QR code®.

Further, other forms of a communication channel are not required to anonymously convey the encoded data from the kiosk 100 to the portable electronic device 302. For example, sending a text message from the portable electronic device 302 to the kiosk 100 (or a service or other terminal associated with the kiosk 100) would convey contact information (e.g., phone number) for the portable electronic device 302 to the kiosk 100. Similarly, requiring the pedestrian 106 to input an email address as a prerequisite to the kiosk 100 conveying information to the portable electronic device 302 would convey personal information (e.g., the email address) about the pedestrian 106 to the kiosk 100. Optically interrogating the QR code® displayed by the kiosk 100 avoids the requirement to grant the kiosk 100 (or other terminal) access to such information, which could later be used by a third party for a variety of purposes such as marketing and solicitation purposes. Concerns over the increasing volume of unsolicited marketing and promotional communications may cause the pedestrian 106 to avoid providing such information to the kiosk 100, minimizing use of the kiosk 100. Instead, the digital image 310 can be captured unilaterally by the portable electronic device 302, without a one-way or two-way wireless communication channel being established between the portable electronic device 302 and the kiosk 100, and without conveying contact or personal information about the pedestrian 106 to the kiosk 100. Privacy concerns on the part of the pedestrian 106 over communicating with the publicly-accessible kiosk 100 can be addressed.

Figure 4:
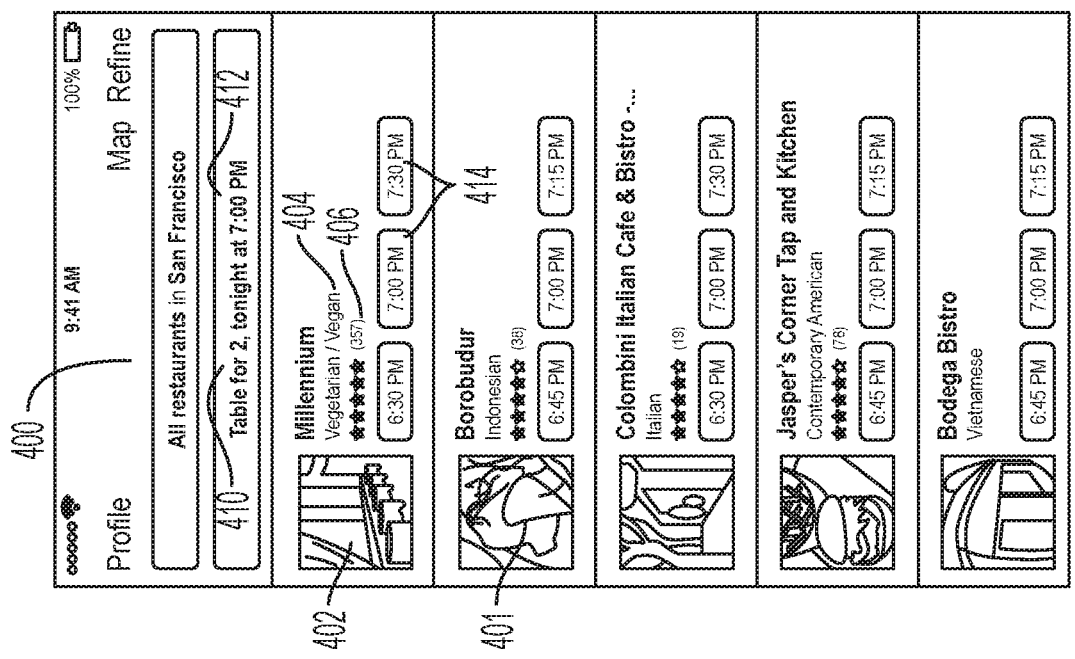
FIG. 4 shows an illustrative example of dining options displayed by a portable electronic device in response to interpreting a digital image of a computer-readable code displayed by a kiosk.

As a result of interpreting the digital image 310, a computer processor provided to the portable electronic device 302 can cause the portable electronic device 302 to access the resource encoded by the QR code®. Using the selected dining option as an example once again, interpreting the QR code® can cause the portable electronic device 302 to display at least the selected local dining option 402 in a mobile application executing on the portable electronic device 302, as shown in FIG. 4. The selected local dining option 402 can optionally be displayed in addition to one or more other dining options 401 that were not selected, but are located in close geographic proximity to the selected local dining option 402. The other dining options 401 can be displayed as possible fallback options for the pedestrian in the event a reservation is unavailable at the selected local dining option 402, if the selected local dining option 402 is not open, etc.

The local dining option 402, and any other dining options 401, can optionally be retrieved or otherwise obtained from a website operated and/or hosted by, or on behalf of a third party. Interpretation of the QR code® by the portable electronic device 302 can point the portable electronic device 302 to the website, identify a URL for the website, or otherwise cause the portable electronic device 302 to access the website over the Internet or other communication network.

For example, the website, such as Open Table for example, can optionally be accessed and displayed as a dining scheduler 400 by the portable electronic device 302. As shown in FIG. 4, the displayed information can include at least a portion of the information described with respect to the dining interface above. The pedestrian 106 can input the number of patrons 410 who will be dining, as well as a desired time 412 when they would like to dine into the website displayed by the portable electronic device 302. Selectable reservation options 414 for the selected local dining option 402, and optionally the other dining option(s) 401, can include times at which a reservation is available for a party of that size. The selectable reservation options can optionally be sortable based on type of cuisine 404, rating 406, and the like.

According to other embodiments, rather than simply directing the portable electronic device 302 to the website, the QR code® can encode information input by the pedestrian 106 into the kiosk 100. Thus, interpretation of the QR code® by the portable electronic device 302 may not simply control the portable electronic device 302 to open the splash page of the website. Instead, interpretation of the QR code® may cause the portable electronic device 302 to display a portion of the website that would be displayed had the pedestrian entered the information input to the kiosk 100, into the portable electronic device 302. For example, the pedestrian may have entered the party size and desired reservation time into the kiosk 100. In FIG. 4, the website is shown displayed with the party size 410 and the reservation time 412 already populated with the information input into the kiosk 100. Thus, the pedestrian 106 can simply touch one of the selectable reservation options to input a desire to make a reservation at the selected one of the time options 414.

Further, the information encoded by the QR code® can optionally be supplemented with information available to the portable electronic device 302. For instance, if the pedestrian 106 has an Open Table account, and is logged into that account on the portable electronic device 302, then the pedestrian's name can be associated with the selected one of the time options 414 and the reservation submitted in response to selection of one of the time options 414. If the pedestrian 106 is not logged into an account, the pedestrian 106 may be prompted by the portable electronic device 302 to log into an account, or create an account before the reservation request can be submitted.

The dining interface presented by the display device 110 can also including a mapping icon for one or more of the dining options displayed. The pedestrian 106 may have a desire to eat at a restaurant where reservations are unnecessary, or not accepted. Instead, the pedestrian 106 may simply require directions to the restaurant of interest. Rather than selecting an option to make a reservation, the pedestrian can select the mapping icon for the restaurant by submitting input to the touch-sensitive display device 110.

In response to selection of the mapping icon, the computer-readable code 300 can again be generated by the control system 114 and displayed by the display device as shown in FIG. 3. The pedestrian 106 can capture the digital image 310 of the computer-readable code 300 using the camera 304 of the portable electronic device 302. As described above, the digital image 310 can be captured without a one-way or two-way wireless communication channel being established between the portable electronic device 302 and the kiosk 100. Information encoded by the computer-readable code 300 is utilized by the portable electronic device 302 to access a navigation resource over the Internet using a cellular and/or a local area network communication protocol.

Figure 5:
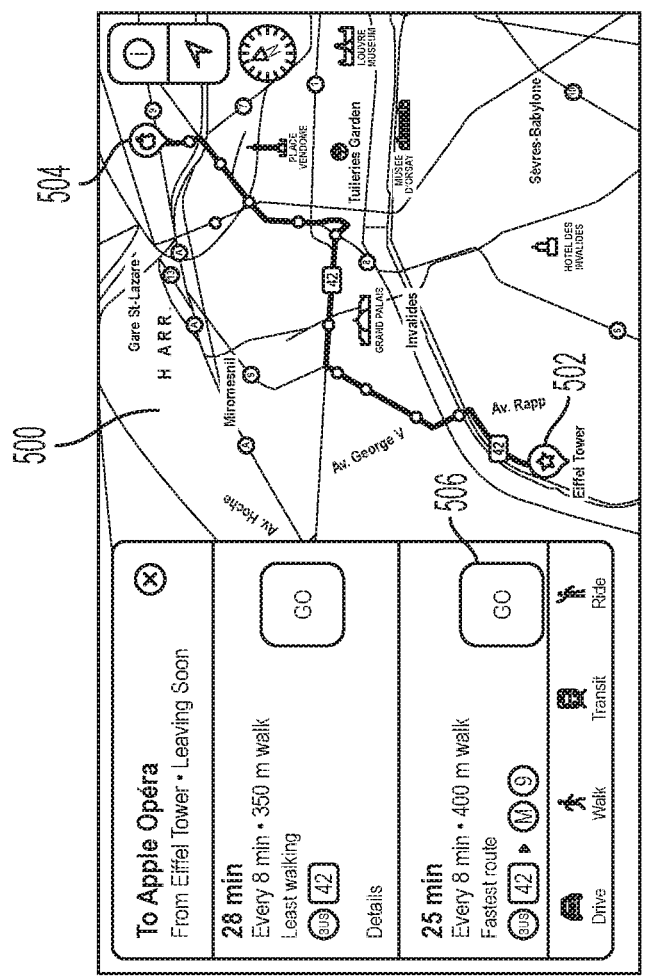
FIG. 5 shows an illustrative embodiment of a navigation interface displayed by a portable electronic device in response to interpreting a digital image of a computer-readable code displayed by a kiosk.

Interpretation of the digital image 310 by a computer processor provided to the portable electronic device 302 causes the portable electronic device 302 to submit the location of the desired restaurant to the navigation resource. In response, the portable electronic device 302 generates and displays a navigation interface 500, as shown in FIG. 5. The starting location 502 submitted can be the geographic location of the kiosk 100. The destination location 504 can be the address, Global Positioning System coordinates, or other descriptor of the restaurant's location. Based on the starting location and the destination location, the navigation resource determines turn-by-turn walking directions between the two locations 502, 504.

To limit the manual entry of information into the portable electronic device 302 required to obtain suitable directions, the computer-readable code can encode information indicative of at least one of the starting location 502 and the destination location 504, as entered into the touch-sensitive display device 110. Interpretation of the digital image 310 by the portable electronic device 302 allows the portable electronic device 302 to display the navigation interface 500 with a "Go" button 506 active. In other words, the computer-readable code 300 encodes information indicative of the navigation resource, and optionally also information indicative of the starting and/or destination location(s). Avoiding repetitive data entry, the navigation interface 500 is caused to be displayed as a result of interpretation of the digital image 310 to allow the pedestrian 106 to select the Go button 506, and immediately begin providing navigation instructions between the starting and destination locations 502, 504. Intermediate steps requiring additional data entry by the pedestrian 106 into the portable electronic device 302 may be avoided.

The preceding example involved encoding walking directions between locations that are close to each other using a computer-readable code 300. However, some destinations may be too far to walk to from the kiosk 100. When identifying a destination location with user input to the touch-sensitive display device 110, the pedestrian 106 can optionally input a request for public or private transportation to the kiosk 100. Based on the user input, the control system 114 of the kiosk 100 generates and displays the computer-readable code 300. Capturing and interpreting the digital image 310 with the portable electronic device 302 can cause the portable electronic device 302 to execute the appropriate application to access a transportation resource over the Internet or local area network.

Figures 6, 8:
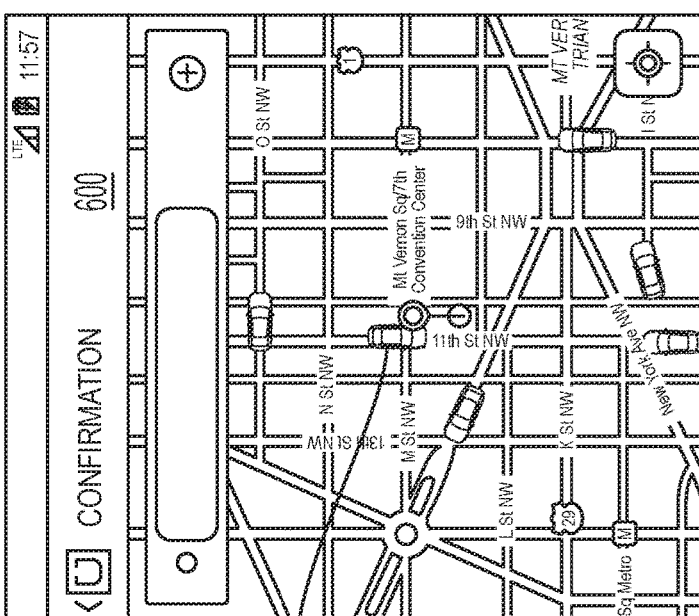
FIG. 6 shows an illustrative example of a user interface of a transportation application displayed by a portable electronic device in response to interpreting a digital image of a computer-readable code displayed by a kiosk.
FIG. 8 is an illustrative example of a user interface of a travel application displayed by a portable electronic device in response to interpreting a digital image of a computer-readable code displayed by a kiosk.

For example, as shown in FIG. 6, an Uber application 600 is executed by the portable electronic device 302 in response to interpreting the digital image 310. At least the starting location (at the kiosk 100) can be automatically entered into the Uber application as a result of interpretation of the digital code 310 and submitted to an Uber server or other transportation resource over the Internet or a local area network. At least one, and optionally a plurality of the Uber drivers 602 nearest the kiosk 100 at a time the request for transportation is submitted can be displayed within the Uber application 600. Instead of being required to manually enter location information into the Uber application 600, the pedestrian 106 can optionally select the Request button 604 to confirm that transportation from the nearest Uber drive 602 is requested. Again, interpretation of the digital image 310 can limit, and optionally minimize the need to repetitively enter information input to the kiosk 100 that must also be manually entered into the portable electronic device 302.

Again, the information encoded by the computer-readable code can optionally be supplemented with information available to the portable electronic device 302. For instance, payment information saved in, or otherwise accessible to the Uber application 600 can supplement the information about the starting and/or destination location encoded by the computer-readable code by the portable electronic device 302. Selection of the Request button 604 can thus request the Uber driver, and optionally arrange for payment.

Another embodiment of the icons 204 includes a shopping icon 204B. Selection of the shopping icon 204B via user input entered by the pedestrian 106 using the touch screen display device 110 opens a graphical shopping interface. The shopping interface allows the pedestrian 106 to submit user input for searching retail shopping locations nearby. Similar to the dining interface, the shopping interface includes fields that can receive one or more criteria specified by the pedestrian 106. For example, the shopping interface can allow the pedestrian 106 to specify at least one of: a type of goods the pedestrian is seeking, an identity of a specific good to be purchased, a maximum and/or minimum price threshold of goods to be purchased, a maximum distance from the kiosk 100, etc.

The process for encoding information about nearby shopping options is similar to the process described above for encoding information about nearby dining options. Thus, a detailed discussion is omitted. Generally, however, one or more shopping options can be identified by the control system 114 of the kiosk 100 based on user input submitted via the touch-sensitive display device 110. Information about one or more of the identified shopping options such as location, goods for sale, directions to a shopping location, nearby transportation options available to transport the pedestrian to a shopping option, etc. can be encoded by a computer-readable code 300 that is displayed by the display device 110. According to other embodiments, the information encoded by the QR code® can, when decoded and interpreted by the portable electronic device 302 as described herein, can direct the portable electronic device 302 to an online shopping resource. For example, capturing the digital image 310 of the computer-readable code 300 can control the portable electronic device 302, causing the portable electronic device 302 to launch an executable shopping application such as an application for Amazon®, or navigate to the Amazon® website. The good corresponding to data encoded by the computer-readable code 300 can optionally be retrieved within the launched application or accessed website, allowing the pedestrian 106 to log in and arrange payment and/or delivery of the good, or otherwise complete the transaction using the portable electronic device 302.

The camera 304 of the portable electronic device 302 captures the digital image 310 of the computer-readable code 300. The digital image 310 is interpreted by the portable electronic device 302 to cause the portable electronic device 302 to execute an appropriate application, and optionally access a network-accessible resource over the Internet and/or a local area network. As a result of accessing the network-accessible resource, the portable electronic device 302 can facilitate payment for a good (e.g., transmit or select payment information such as a credit card number, third-party payer account information such as PayPal account information, etc.), transmit or confirm shipping information for delivery of the good being purchased, provide directions to a shopping destination where the good can be purchased and optionally picked up in person by the pedestrian 106 or another party, and/or arrange for transportation to a shopping destination, in a manner analogous to that described above.

Another embodiment of the icons 204 includes an arts and culture icon 204C. Selection of the arts and culture icon 204C via user input entered by the pedestrian 106 using the touch-sensitive display device 110 opens a graphical art interface. The art interface allows the pedestrian 106 to submit user input for searching artistic, cultural or other entertainment events nearby. The art interface includes fields that can receive one or more criteria specified by the pedestrian 106. For example, the art interface can allow the pedestrian 106 to specify at least one of: an exhibit, concert or show; venue; a start time; a class of events; a maximum and/or minimum price threshold for admission; a maximum distance from the kiosk 100; etc.

The process for encoding information about nearby artistic, cultural or other entertainment events is similar to the process described above for encoding information about nearby dining options. Thus, a detailed discussion is omitted. Generally, however, one or more artistic, cultural or other entertainment options can be identified by the control system 114 of the kiosk 100 based on user input submitted via the touch-sensitive display device 110. Information about one or more of the identified options such as location, start time, venue, directions to a venue, nearby transportation options available to transport the pedestrian to an event, etc. can be encoded by a computer-readable code 300 that is displayed by the display device 110.

The camera 304 of the portable electronic device 302 captures the digital image 310 of the computer-readable code 300. The digital image 310 is interpreted by the portable electronic device 302 to cause the portable electronic device 302 to execute an appropriate application, and optionally access a network-accessible resource over the Internet and/or a local area network. As a result of accessing the network-accessible resource, the portable electronic device 302 can facilitate payment for one or more tickets to an event, provide directions to a venue where an event is being held, and/or arrange for transportation to a venue, in a manner analogous to that described above.

Embodiments of the culture icon 204C can also optionally allow the pedestrian 106 to select audio, video, and/or other media content of interest to the pedestrian 106. For example, the pedestrian 106 can input to the kiosk 100 an artist, a genre, song, album, lyrics, rating information, time period, and/or other information about music that the pedestrian 106 desires to listen to. As another example, the pedestrian 106 can input a movie, television show, actor/actress/performer, genre, subject, rating information, time period, and/or other information about video content that the pedestrian 106 desires to view. Upon receiving such information, the control system 114 can encode information related to the input audio and/or video and/or media content in a computer-readable code 300 to be displayed by the display device 110.

The camera 304 of the portable electronic device 302 captures the digital image 310 of the computer-readable code 300. The digital image 310 is interpreted by the portable electronic device 302 to cause the portable electronic device 302 to execute, install or otherwise access an appropriate executable application or network-accessible resource (e.g., iTunes, Spotify, YouTube, etc.) for purchasing, streaming or otherwise accessing the audio, video and/or other media content over the Internet and/or a local area network. Execution of the appropriate executable application can allow the pedestrian 106 (optionally along with others who capture the digital image 310 with their portable electronic devices 302) can involve playback of the corresponding audio, video and/or other media using the portable electronic device 302, in a manner analogous to that described above.

Another embodiment of the icons 204 includes a travel icon 204D. Selection of the travel icon 204D via user input entered by the pedestrian 106 using the touch-sensitive display device 110 opens a graphical travel interface. The travel interface allows the pedestrian 106 to submit user input for searching for, and optionally making travel and/or lodging arrangements. The travel interface includes fields that can receive one or more criteria specified by the pedestrian 106. For example, the lodging interface can allow the pedestrian 106 to specify at least one of: a destination location, flight information, a lodging preference, a travel date, a maximum and/or minimum price threshold for travel or lodging arrangements, a maximum distance from the kiosk 100, etc.

The process for encoding information about nearby travel-relate destinations is similar to the process described above for encoding information about nearby dining options. Accordingly, a detailed discussion is omitted. Generally, however, one or more travel options can be identified by the control system 114 of the kiosk 100 based on user input submitted via the touch-sensitive display device 110. Information about one or more of the identified options such as a destination location, flight information, a lodging preference, a travel date, a maximum and/or minimum price threshold for travel or lodging arrangements, a maximum distance from the kiosk 100, etc. can be encoded by a computer-readable code 300 that is displayed by the display device 110.

Figure 7:
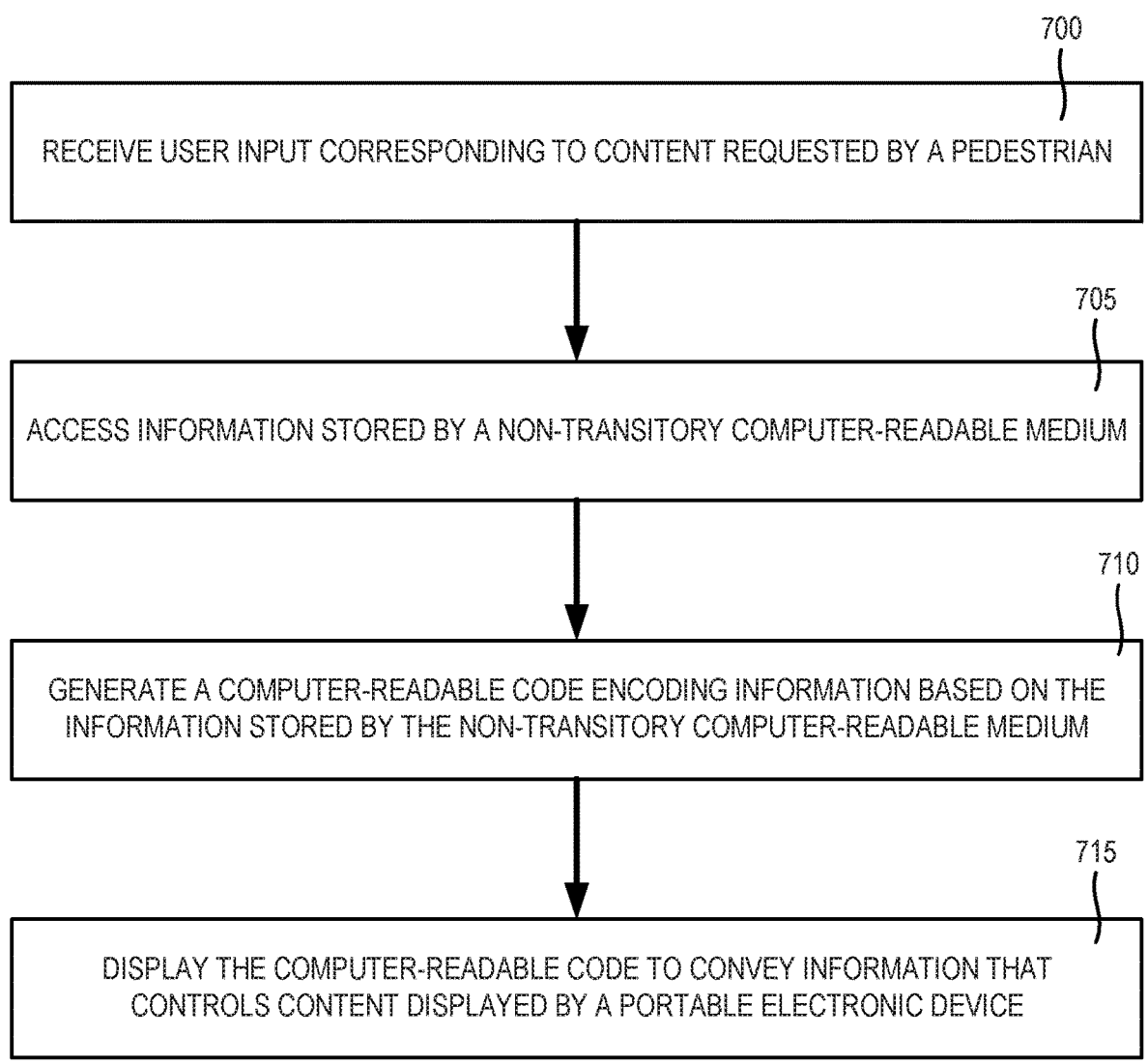
FIG. 7 is a flow diagram schematically illustrating a process for anonymously transmitting information encoded by a computer-readable code to a portable electronic device.

For example, as generally summarized by the flow diagram of FIG. 7, the pedestrian 106 can provide user input via the touch-sensitive display device 110 to request a hotel room near the kiosk 100, or at another location specified by the pedestrian 106. Any other criteria can be input by the pedestrian 106 via the display device 110 to filter the search results for hotels returned by a search of a hotel database. For instance, the pedestrian 106 can optionally input at least one of: a specific room or a room type, the number of guests who will sleep in the room, the nights of the stay in the selected room, and/or any other details concerning the room reservation.

In response to receiving the user input at block 700, the control system 114 of the kiosk 100 accesses information stored by a non-transitory computer-readable medium at block 705, and retrieves a portion of the stored information. As mentioned above, the non-transitory computer-readable medium can be locally connected to the control system 114, or remotely located to be accessed over the Internet and/or local area network. According to the present example, at least a portion of the retrieved information can include available hotel rooms satisfying the input criteria, displayed as search results by the display device 110. The pedestrian 106 can select a desired room from the displayed results and begin the process of reserving the desired room.

As a result of the control system receiving the pedestrian's selection of the desired room from the search results, and optionally receiving confirmation that the selected room is to be reserved, the control system 114 generates a computer-readable code 300 at block 710. The computer-readable code 300 encodes information including at least one of: a travel application 800 (FIG. 8) to be executed by the portable electronic device 302, a hotel at which the room is to be reserved, a specific room or room type to be reserved, one or more dates for which the selected room is to be reserved, and any other pertinent information input by the pedestrian into the kiosk 100.

The computer-readable code 300 is displayed by the display device 110 under the control of the control system 114 at block 715. The camera 304 of the portable electronic device 302 carried by the pedestrian 106 (or another member of the pedestrian's party) can be used to capture the digital image 310 of the computer-readable code 300. The digital image 310 is interpreted by the computer processor of the portable electronic device 302 to cause the portable electronic device 302 to execute a travel application 800, a user interface of which is shown in FIG. 8. The portable electronic device 302 can also access a network-accessible resource over the Internet and/or a local area network, to populate the travel application 800 with at least a portion of the hotel information encoded by the computer-readable code 300. For example, the portable electronic device 302 can access a website associated with the hotel encoded by the computer-readable code 300. The dates of the stay 802 and number of guests 804 can be input to the website based on the information encoded by the computer-readable code 300.

The information obtained by the portable electronic device 302 can optionally be supplemented with additional information available to the portable electronic device 302. For example, the pedestrian's name or other identifying information can be stored in a non-transitory computer memory, and saved in association with a user account for the hotel website. Payment information such as a credit card number, a bank account number, account information for a third-party payor such as PayPal, etc. can also be saved to the user account. With such information available, the pedestrian 106 or other member of the pedestrian's party can select the Book button 806, to complete the hotel reservation. If the pedestrian 106 was logged into the account at a time when the digital image 310 was interpreted, interpretation of the digital image 310 by the control system 114 can cause the user interface shown in FIG. 8 to be displayed, requiring selection of only the Book button 806 to complete the reservation, thereby avoiding the need for redundant data entry.

As a result of accessing the network-accessible resource, the portable electronic device 302 can facilitate payment for one or travel arrangements such as a hotel room, an airline ticket, a rental car, etc. Thus, a travel transaction, and any other type of transaction can be initiated using the public kiosk 100, and private payment and/or reservation information can be submitted via the portable electronic device 302. Although the example above explains reserving a hotel room, the present disclosure is not so limited. Other embodiments of the travel application 800 can be utilized to buy a plane ticket, rail ticket, or bus ticket; provide directions to a hotel, a rental car facility, a rail station, and/or a bus stop; and/or arrange for transportation to a destination in a manner analogous to that described above.

In addition to dividing payment and other aspects of a transaction requiring privacy and security from the aspects that can be performed on a public terminal, the present subject matter can facilitate the anonymous transfer of other content. For example, as mentioned above the kiosk 100 includes a camera 116 that can capture digital photographs. The photographs can be stored locally at the kiosk 100, or remotely in a non-transitory computer-readable medium. To make the photographs available for retrieval by the portable electronic device 302, the control system 114 of the kiosk 100 generates and displays the computer-readable code 300 corresponding to the photograph. The computer-readable code 300 of the present embodiment can encode a network address, or other information pointing to or specifying the storage location of the photograph in question.

Figure 9:
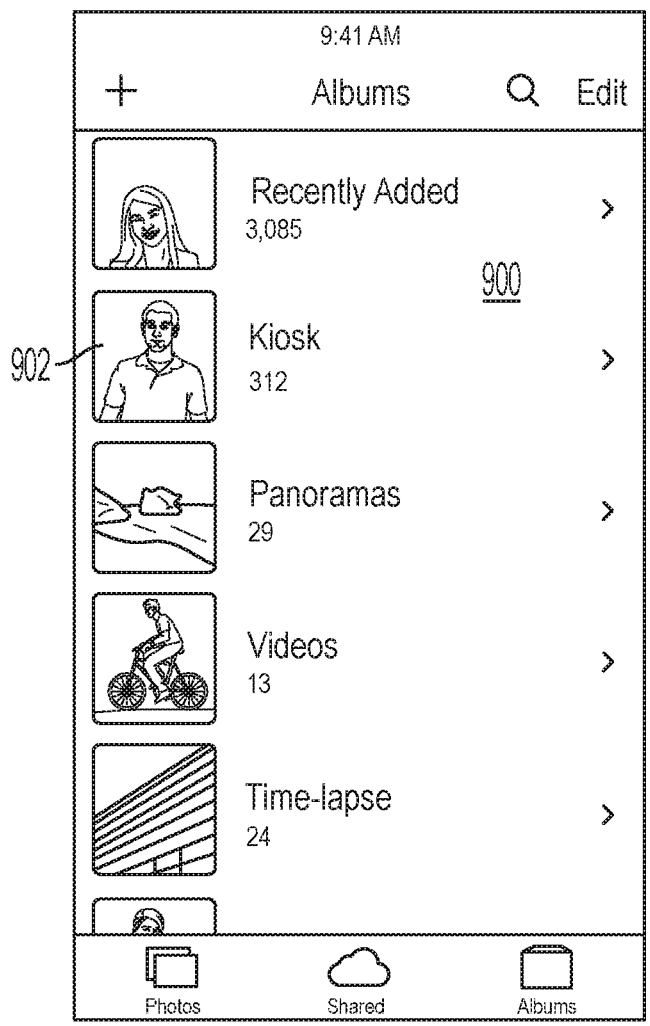
FIG. 9 is an illustrative embodiment of a user interface displayed by executing a photo viewing application in response to interpreting a digital image of a computer-readable code displayed by a kiosk.

The camera 304 of the portable electronic device 302 carried by the pedestrian 106 (or another member of the pedestrian's party) can be used to capture the digital image 310 of the computer-readable code 300. The digital image 310 is interpreted by the computer processor of the portable electronic device 302 to cause the portable electronic device 302 to execute a photo viewing application 900, a user interface of which is shown in FIG. 9. The portable electronic device 302 accesses the storage location of the photograph based on the information obtained by interpreting the digital image 310, and retrieves the photograph over the Internet or local area network. The retrieved photograph can be stored in a memory device provided to the portable electronic device 302, and/or in a remote photo storage location such as iCloud, for example. Optically providing the photograph retrieval information via the computer-readable code 300 effectively transfers the photograph to the portable electronic device 302 without establishing a communication channel between the kiosk 100 and the portable electronic device that would require the exchange of communication information.

Embodiments of the computer-readable code 300 associated with a photograph and/or video captured by the camera 116 of the kiosk 100 can be captured and analyzed by portable electronic device 302 to control posting of the photograph and/or video to a website or other network-accessible resource. For example, in response to the pedestrian's selecting the photograph and/or video captured by the camera 116 and receipt of input indicating a desire to post the selected photograph and/or video, the control system 114 can cause a corresponding computer-readable code 300 to be displayed.

The digital image 310 of the computer-readable code 300 can be captured by the camera 304 as described elsewhere herein. The encoded data conveyed to the portable electronic device 302 as a result can optionally include information such as a network address (e.g., IP address) or URL, or another locator, identifier, or tracker that points to a website or other network-accessible resource. According to such an example, the portable electronic device 302 can access a website (e.g., Facebook, Instagram, YouTube, etc.) or other network-access resource identified by the computer-readable code 300, allowing the pedestrian 106 to complete a process of posting the photograph and/or video to the identified website or other resource (e.g., logging in and/or confirming a desire to poste the photograph and/or video).

Computing Device Embodiment

Figure 10:
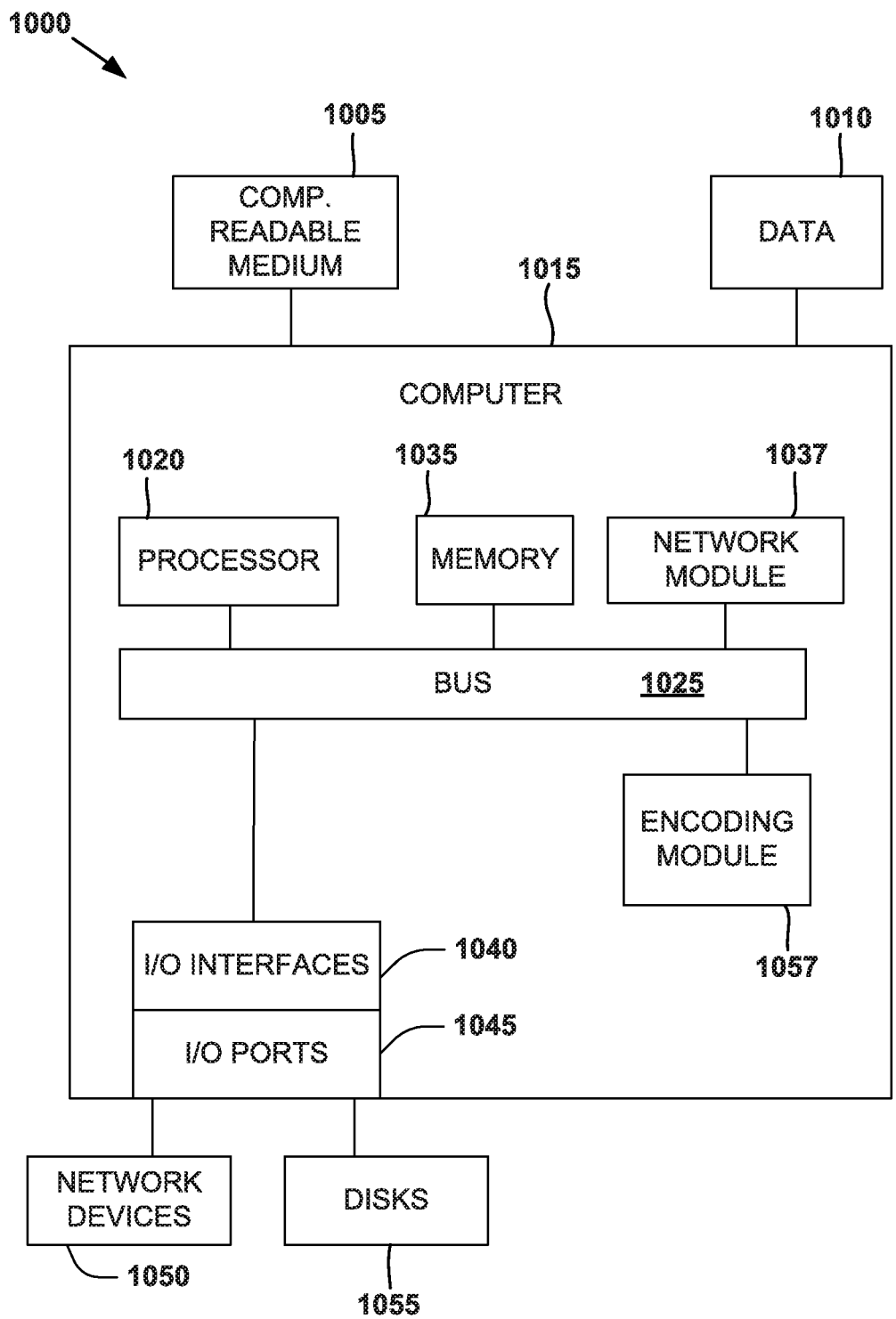
FIG. 10 illustrates an embodiment of a computing device configured as the illustrative embodiments of a kiosk and/or a portable electronic device described herein, and/or to perform various methods disclosed.

FIG. 10 illustrates an example of a computing device 1000 that is configured and/or programmed with one or more of the illustrative systems and methods described herein, and/or equivalents. The illustrative embodiment of the computing device 1000 may include a computer 1015 that includes a computer processor 1020, a memory 1035, and input/output ports 1045 operably connected by a bus 1025. In one example, the computer 1015 may include encoding module logic 1057 configured to facilitate the generation and display of the computer-readable code 300 and network module logic 1037 to facilitate network communications as described herein, and/or configured to implement and perform the methods described herein. In different examples, the logic 1037, 1057 may be implemented in hardware, a non-transitory computer-readable medium with stored instructions, firmware, and/or combinations thereof. While the logic 1037, 1057 is illustrated as hardware components attached to the bus 1025, it is to be appreciated that in other embodiments, the logic 1037, 1057 could be implemented in the computer processor 1020, stored in memory 1035, or stored in a non-transitory computer-readable medium 1005.

The computer 1015 may be implemented, for example, as an ASIC programmed to create generate and display a computer-readable code as described herein. According to alternate embodiments, the technology for generating and displaying the computer-readable code may also be implemented as stored computer executable instructions that are presented to the computer 1015 as data 1010 that are temporarily stored in memory 1035 and then executed by computer processor 1020.

Logic 1037, 1057 may also be embodied as hardware such as a non-transitory computer-readable medium that stores executable instructions, firmware, etc. When executed, the executable instructions perform a method of anonymously conveying content from a public kiosk to a private portable electronic device as described herein.

Generally describing an illustrative configuration of the computer 1015, the computer processor 1020 may be a variety of various processors including dual microprocessor and other multi-processor architectures. A memory 1035 may include volatile memory and/or non-volatile memory. Non-volatile memory may include, for example, ROM, PROM, and so on. Volatile memory may include, for example, RAM, SRAM, DRAM, and so on.

A storage disk 1055 may be operably connected to the computer 1015 via, for example, an input/output (I/O) interface (e.g., card, device) 1040 and an input/output port 1045. The disk 1055 may be, for example, a magnetic disk drive, a solid-state disk drive, a floppy disk drive, a tape drive, a Zip drive, a flash memory card, a memory stick, and so on. Furthermore, the disk 1055 may be a CD-ROM drive, a CD-R drive, a CD-RW drive, a DVD ROM, and so on. The memory 1035 can store a process and/or a data 1010, for example. The disk 1055 and/or the memory 1035 can store an operating system that controls and allocates resources of the computer 1015.

The computer 1015 may interact with input/output (I/O) devices via the I/O interfaces 1040 and the input/output ports 1045. Input/output devices may be, for example, a keyboard, a microphone, a pointing and selection device, cameras, video cards, displays, the disk 1055, the network devices 1050, and so on. The input/output ports 1045 may include, for example, serial ports, parallel ports, and USB ports.

The computer 1015 can operate in a network environment and thus may be connected to the network devices 1050 via the I/O interfaces 1040, and/or the I/O ports 1045. Through the network devices 1050, the computer 1015 may interact with a network. Through the network, the computer 1015 may be logically connected to remote computers. Networks with which the computer 1015 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a computer processor, a computer, a server operating in a cloud computing system, and so on. In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "alternate embodiment," "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
ROM: read only memory.
USB: universal serial bus.
WAN: wide area network.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A kiosk that communicates with a portable electronic device, the kiosk comprising:
    a base constructed for installation in a public setting;
    an interface that is supportable by the base, and receives user input corresponding to content requested by a user;
    a control system comprising at least one computer processor that, as a result of executing computer-accessible instructions, causes the control system to access information stored by a non-transitory computer memory and generate an output comprising a computer-readable code related to the content requested by the user, wherein the non-transitory computer memory is located remotely of the kiosk, and the at least one computer processor receives at least a portion of the information in a transmission over a communication network; and
    a display device operatively connected to the control system to graphically display the computer-readable code in a manner to be captured by an optical imaging device provided to the portable electronic device, wherein the computer-readable code encodes data conveyed to the portable electronic device optically in an anonymous manner, and wherein the computer-readable code is interpreted by the portable electronic device as a result of being captured by the optical imaging device, causing the portable electronic device to execute computer-executable instructions stored by the portable electronic device to perform an operation corresponding to the computer-readable code, wherein the computer-readable code causes the portable electronic device to perform the operation without requiring the portable electronic device to transmit data to the kiosk and without requiring communicating to the kiosk contact information of the portable electronic device and without requiring communicating to the kiosk personal information of the user such that the portable electronic device interacts with the kiosk anonymously.

2. The kiosk of claim 1, wherein the interface comprises a touch-sensitive circuit that: (i) is coupled to the display device, and (ii) receives the user input responsive to contact between the user and the display device.

3. The kiosk of claim 1, wherein the at least one computer processor generates the computer-readable code as a pattern of markings compliant with a coding standard that is interpretable by the portable electronic device.

4. The kiosk of claim 3, wherein the pattern of markings controls the portable electronic device, causing the portable electronic device to launch an executable application or access a payment site that arranges payment for a product or service corresponding to the content requested by the user via the interface of the kiosk.

5. The kiosk of claim 3, wherein the pattern of markings controls the portable electronic device, causing the portable electronic device to launch an application or access a network-accessible site that provides directions to a destination corresponding to the content requested by the user via the interface of the kiosk.

6. The kiosk of claim 5, wherein the pattern of markings, when captured by the optical imaging device, causes the portable electronic device to display the directions as part of a graphical user interface.

7. The kiosk of claim 1, wherein the operation performed in response to execution of the computer-executable instructions stored by the portable electronic device comprises at least one of:
    launching an executable application on the portable electronic device;
    accessing a resource for installing a new executable application on the portable electronic device; and
    transmitting content to a network-accessible resource indicated by the computer-readable code.

8. The kiosk of claim 1 further comprising a camera that captures an image in response to user input entered into the kiosk, wherein the computer-readable code is interpretable by the portable electronic device to cause the portable electronic device to access a network-accessible storage location to obtain the image.

9. A method of communicating with a portable electronic device, the method comprising:
    receiving, with an interface of a kiosk that is supported by a base installed in a public setting, user input corresponding to content requested by a user;
    accessing, with at least one computer processor, information stored by a non-transitory computer-readable medium, wherein accessing the information comprises locally retrieving a portion of the information from the non-transitory computer-readable medium that is locally installed in the kiosk and is supported by the base at the public setting;
    generating, with the at least one computer processor, an output comprising a computer-readable code encoding the content requested by the user; and
    displaying, with a computer display device operatively connected to the at least one computer processor, the output including the computer-readable code in a manner to be captured by an optical imaging device provided to the portable electronic device, wherein the computer-readable code encodes data conveyed to the portable electronic device optically in an anonymous manner, and wherein the computer-readable code included in the displayed output is interpretable by the portable electronic device as a result of being captured to cause the portable electronic device to execute computer-executable instructions stored by the portable electronic device to perform an operation corresponding to the computer-readable code, wherein the computer-readable code causes the portable electronic device to perform the operation based on capturing of the computer-readable code without requiring communicating to the kiosk contact information of the portable electronic device and without requiring communicating to the kiosk personal information of the user such that the portable electronic device interacts with the kiosk anonymously.

10. The method of claim 9, wherein the user input is received by the interface as a result of contact between the user and the computer display device.

11. The method of claim 9, wherein displaying the output comprises displaying the computer-readable code as a pattern of markings compliant with a coding standard, and the pattern of markings, when interpreted by the portable electronic device, controls the portable electronic device to provide payment for a product or service corresponding to the content requested by the user via the interface of the kiosk as the operation.

12. The method of claim 9, wherein displaying the output comprises displaying the computer-readable code as a pattern of markings compliant with a coding standard, and the pattern of markings, when interpreted by the portable electronic device, controls the portable electronic device to provide directions to a destination corresponding to the content requested by the user via the interface of the kiosk.

13. A kiosk that communicates with a portable electronic device, the kiosk comprising:
 a base constructed for installation in a public setting;
 an interface that is supportable by the base, and receives user input corresponding to content requested by a user;
 a control system comprising at least one computer processor that, as a result of executing computer-accessible instructions, causes the control system to access information stored by a non-transitory computer memory and generate an output comprising a computer-readable code related to the content requested by the user, wherein the non-transitory computer memory locally stores at least a portion of the information accessed by the at least one computer processor, at the kiosk, to generate the output comprising the computer-readable code; and
 a display device operatively connected to the control system to graphically display the computer-readable code in a manner to be captured by an optical imaging device provided to the portable electronic device, wherein the computer-readable code encodes data conveyed to the portable electronic device optically in an anonymous manner, and wherein the computer-readable code is interpreted by the portable electronic device as a result of being captured by the optical imaging device, causing the portable electronic device to execute computer-executable instructions stored by the portable electronic device to perform an operation corresponding to the computer-readable code, wherein the computer-readable code causes the portable electronic device to perform the operation without requiring the portable electronic device to transmit data to the kiosk, and without requiring communicating to the kiosk contact information of the portable electronic device and without requiring communicating to the kiosk personal information of the user such that the portable electronic device interacts with the kiosk anonymously.

* * * * *